US009008578B2

(12) United States Patent
Lee

(10) Patent No.: US 9,008,578 B2
(45) Date of Patent: Apr. 14, 2015

(54) DATA COMMUNICATION

(75) Inventor: Hyoung-Gon Lee, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 125 days.

(21) Appl. No.: 13/700,104

(22) PCT Filed: Jun. 13, 2012

(86) PCT No.: PCT/US2012/042305
§ 371 (c)(1),
(2), (4) Date: Nov. 26, 2012

(87) PCT Pub. No.: WO2013/187893
PCT Pub. Date: Dec. 19, 2013

(65) Prior Publication Data
US 2013/0337745 A1    Dec. 19, 2013

(51) Int. Cl.
*H04B 5/00* (2006.01)
(52) U.S. Cl.
CPC ............ *H04B 5/0012* (2013.01); *H04B 5/0031* (2013.01)
(58) Field of Classification Search
USPC .............................. 455/41.1, 41.2, 420, 556.1
See application file for complete search history.

(56) References Cited

U.S. PATENT DOCUMENTS

| 7,222,198 B2 | 5/2007 | Stavely et al. |
| 7,884,805 B2 | 2/2011 | Thorn |
| 2010/0260055 A1 | 10/2010 | Anderson et al. |
| 2010/0304793 A1 | 12/2010 | Kim et al. |
| 2011/0102332 A1 | 5/2011 | Birnbaum et al. |
| 2011/0197067 A1 | 8/2011 | Corndorf |
| 2011/0283354 A1 | 11/2011 | Chang et al. |
| 2011/0314153 A1* | 12/2011 | Bathiche et al. ............. 709/225 |
| 2012/0050153 A1 | 3/2012 | Dvortsov et al. |
| 2012/0105081 A1* | 5/2012 | Shaikh et al. ................ 324/686 |

FOREIGN PATENT DOCUMENTS

JP    2009-135632    6/2009

OTHER PUBLICATIONS

International Search Report and Written Opinion from International Application No. PCT/US2012/42305 mailed Aug. 31, 2012.
http://thefutureofthings.com/news/1290/touch-me-to-transfer-data.html., A. Menon, Aug. 2008, pp. 1-4.
http://mobiledeviceinsight.com/2011/11android-beam-takes-us-to-the-future-of-close-proximity-data-exchange/. , by Asad Uj Jaman, Nov. 1, 2011, pp. 1-6.
www.wired.com/gadgetlab/2009/05/prototype-display-combines-touchscreen-morphing-buttons/, by P. Ganapati, May 13, 2009, pp. 1-2.
"Capacitive sensing," Wikipedia, accessed at http://web.archive.org/web/20120207181747/http://en.wikipedia.org/wiki/Capacitive_sensing, last modified on Jan. 30, 2012, pp. 1-5.

(Continued)

*Primary Examiner* — Tuan H Nguyen
(74) *Attorney, Agent, or Firm* — Brundidge & Stanger, P.C.

(57) ABSTRACT

Technologies are generally described for communicating data. In some examples, a method performed under control of a first device may include detecting a second device configured to communicate with the first device and generating a first pattern associated with first information to be transmitted to the second device. The first device is configured to have a pattern handling unit on which the first pattern is generated.

27 Claims, 14 Drawing Sheets

(56) References Cited

OTHER PUBLICATIONS

Ess, D.V., "Capacitive sensing builds a better water-cooler control," EETIMES, accessed at www.eetimes.com/General/PrintView/4009998, accessed on Nov. 19, 2007, pp. 1-8.

Ganapati, P., "Experimental Touchscreen Has Physical Buttons That Can Pop Up, Disappear," accessed at http://web.archive.org/web/20120526045618/http://www.wired.com/gadgetlab/2009/05/prototype-display-combines-touchscreen-morphing-buttons/, May 13, 2009, pp. 1-2.

Ridden, P., "True Touch technology gets Hover Detection," accessed at http://web.archive.org/web/20120210113412/http://www.gizmag.com/cypress-hover-truetouch-touchscreen/14910/, Apr. 27, 2010, pp. 1-3.

* cited by examiner

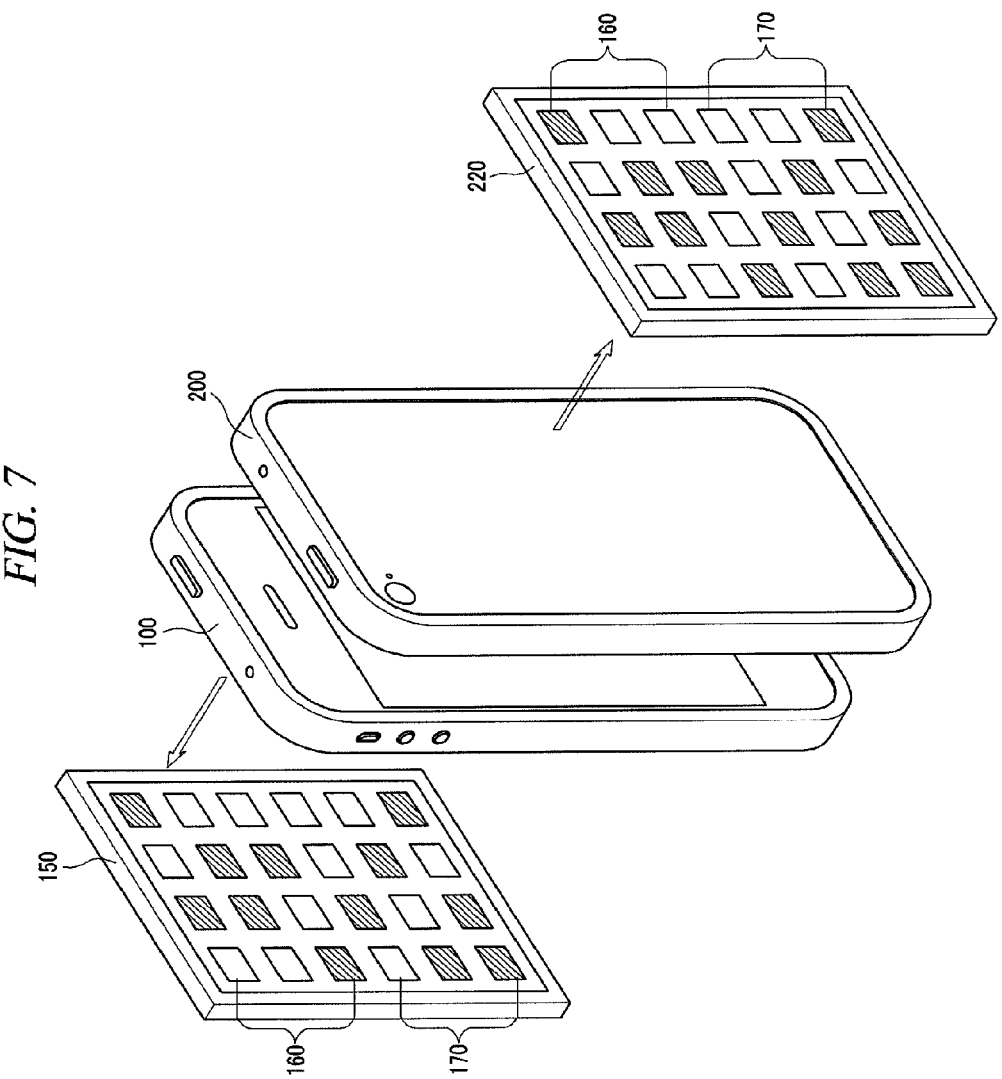

DATA COMMUNICATION

CROSS-REFERENCE TO RELATED APPLICATION

The present application is the U.S. national phase application of International application No. PCT/US12/42305, filed on Jun. 13, 2012, under 35 U.S.C. §371, the entirety of which is incorporated herein by reference.

BACKGROUND

The availability of third generation (3G) and fourth generation (4G) mobile telecommunications technologies and Wi-Fi wireless access technologies make it possible to easily provide wireless communication networks. It is generally impractical for mobile telecommunication devices to utilize wired communication networks, at least on an extended time basis. Thus, security for wireless communication networks has drawn intense scrutiny.

SUMMARY

In an example, a method performed under control of a first device may include detecting a second device configured to communicate with the first device and generating a first pattern associated with first information to be transmitted to the second device. The first device is configured to have a pattern handling unit on which the first pattern is generated.

In an example, a method performed under control of a first device may include detecting a second device configured to communicate with the first device and receiving a first pattern associated with first information and generated by the second device. The first device is configured to have a pattern handling unit having a multiple number of capacitive sensors, and the receiving of the first pattern is performed by detecting a capacitance of each of the multiple number of capacitive sensors of the pattern handling unit.

In an example, a first device may include a detecting unit configured to detect a second device and a pattern handling unit configured to generate a first pattern associated with first information to be transmitted to the second device. The second device may communicate with the first device and the first information is transmitted to the second device when the first device is in contact with or adjacent to the second device.

In an example, a first device may include a detecting unit configured to detect a second device and a pattern handling unit configured to receive a first pattern associated with first information and generated by the second device. The second device may communicate with the first device, the pattern handling unit is further configured to have a multiple number of capacitive sensors, and the pattern handling unit is further configured to receive the first pattern by detecting capacitance of each of the multiple number of capacitive sensors.

In an example, a computer-readable storage medium may have stored thereon computer-executable instructions that, in response to execution, cause a first device to perform operations including detecting a second device configured to communicate with the first device and generating a pattern associated with information to be transmitted to the second device. The first device is configured to have a pattern handling unit on which the pattern is generated.

In an example, a computer-readable storage medium may have stored thereon computer-executable instructions that, in response to execution, cause a first device to perform operations including detecting a second device configured to communicate with the first device and receiving a pattern associated with information of the second device and generated by the second device. The first device is configured to have a pattern handling unit having a multiple number of capacitive sensors, and the receiving of the pattern is performed by detecting capacitance of each of the multiple number of capacitive sensors of the pattern handling unit.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 schematically shows another illustrative example of an environment in which a transmitting device is in contact with a receiving device, arranged in accordance with at least some embodiments described herein;

DETAILED DESCRIPTION

Figure 1:
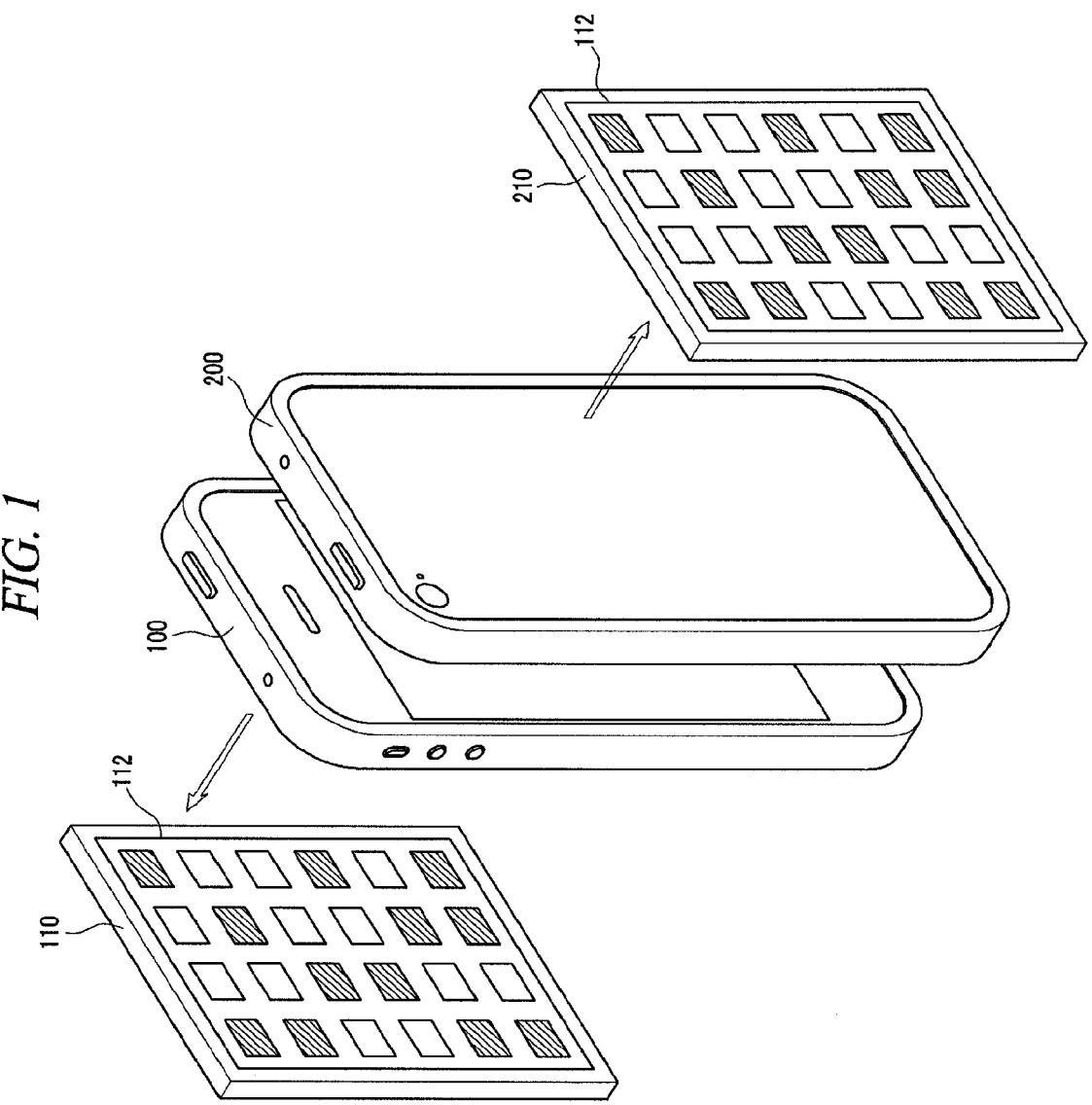
FIG. 1 schematically shows an illustrative example of an environment in which a transmitting device is in contact with a receiving device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to data communication. Technologies are generally described for wireless data communication with enhanced security.

FIG. 1 schematically shows an illustrative example of an environment in which a transmitting device is in contact with a receiving device, arranged in accordance with at least some embodiments described herein. As depicted in FIG. 1, a transmitting device 100 may be in actual contact with, or at least adjacent to, a receiving device 200. In some embodiments, a part of transmitting device 100 may actually be in contact with or adjacent to a part of receiving device 200. By way of example, but not be limited thereto, a display or a screen of transmitting device 100 may actually be in contact with or adjacent, within an acceptable or predetermined distance, to that of receiving device 200. By way of example, but not be limited thereto, transmitting device 100 and receiving device 200 may respectively include a personal portable device, a cellular phone, a smart phone, a digital camera, remote controller and a table PC with a touch screen. Transmitting device 100 may include a pattern handling unit 110 that generates a first pattern 112 associated with information to be transmitted to receiving device 200 when transmitting device 100 is in contact with or adjacent to receiving device 200. Receiving device 200 may include a pattern handling unit 210 which receives first pattern 112 associated with the information transmitted from transmitting device 100 when receiving device 200 is in contact with or adjacent to transmitting device 100.

In some embodiments, transmitting device 100 may detect receiving device 200 which may communicate with transmitting device 100. In some embodiments, transmitting device 100 may detect receiving device 200 to which the information associated with first pattern 112 is transmitted. If transmitting device 100 detects receiving device 200, transmitting device 100 and receiving device 200 may establish a communication protocol for communicating information between transmitting device 100 and receiving device 200. By way of non-limiting example, the communication protocol may include a text, a lookup table or a diagram defining association between a pattern and information. Further, pattern handling unit 110 of transmitting device 100 may generate first pattern 112 associated with the information to be transmitted to receiving device 200 based at least in part on the communication protocol. In some embodiments, the information to be transmitted may be encoded in a spatial pattern such as a symbol. In some other embodiments, the information to be transmitted may be encoded in a temporal pattern such as Morse code. In some other embodiments, the information to be transmitted may be encoded both in a spatial pattern and a temporal pattern.

In some embodiments, receiving device 200 may detect transmitting device 100 which may communicate with receiving device 200. If receiving device 200 detects transmitting device 100, pattern handling unit 210 of receiving unit 200 may receive first pattern 112 associated with the information received by receiving device 200. Receiving device 200 may decode first pattern 112 associated with the information based at least in part on the communication protocol established between transmitting device 100 and receiving device 200 and acquire the information transmitted from transmitting device 100.

Figure 2A:
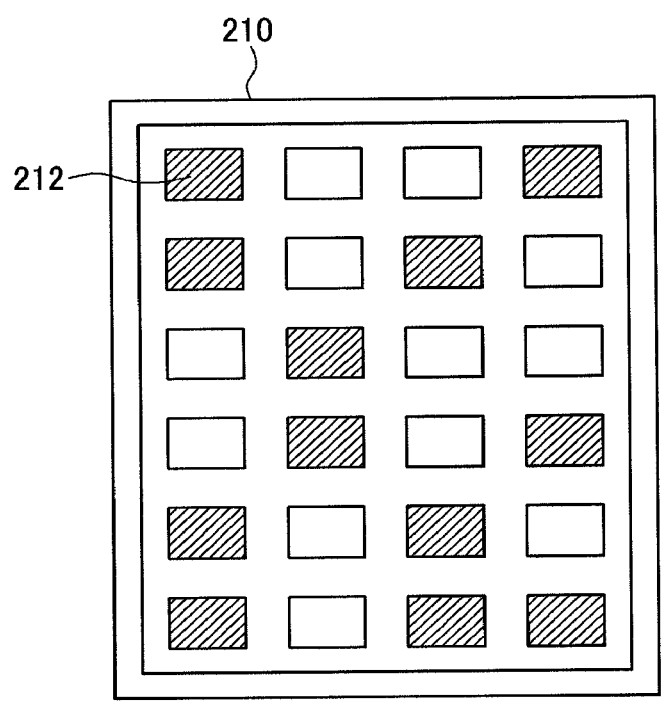
FIG. 2A schematically shows an illustrative example of a pattern handling unit of a receiving device, arranged in accordance with at least some embodiments described herein.

FIG. 2A schematically shows an illustrative example of pattern handling unit 210 of receiving device 200, arranged in accordance with at least some embodiments described herein. In some embodiments, as depicted in FIG. 2A, pattern handling unit 210 may include a multiple number of capacitive sensors 212. In the non-limiting example of FIG. 2A, capacitive sensors 212 are arranged in a 4×6 configuration.

Figure 2B:
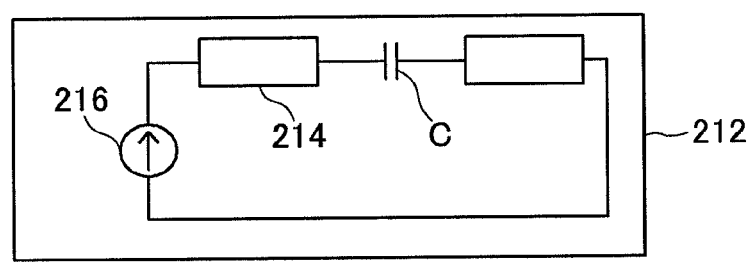
FIG. 2B schematically shows an illustrative example of a capacitive sensor, arranged in accordance with at least some embodiments described herein.

FIG. 2B schematically shows an illustrative example of each of capacitive sensors 212, arranged in accordance with at least some embodiments described herein. In some embodiments, as depicted in FIG. 2B, each of capacitive sensors 212 may include two electrodes 214 and a current source 216 for applying current to two electrodes 214. A capacitor C may be formed between two electrodes 214 of each of capacitive sensors 212. When a conductive object is in contact with capacitive sensor 212 or is adjacent to capacitive sensor 212, capacitance of capacitor C may be changed. Each of capacitive sensors 212 may measure changes to the capacitance of capacitor C corresponding thereto.

In some embodiments, each of capacitive sensors 212 may measure changes to the capacitance of capacitor C by measuring a time for a voltage between two electrodes 214 to reach a threshold voltage. The time to reach the threshold voltage may depend on the capacitance of capacitor C.

Pattern handling unit 210 of receiving device 200 may receive first pattern 112 by detecting changes to the capacitance of capacitor C corresponding to each of capacitive sensors 212. If pattern handling unit 110 of transmitting device 100 is in contact with receiving device 200 or is adjacent to receiving device 200, the capacitance of capacitor C corresponding to each of capacitive sensors 212 may be changed. Then each of capacitive sensors 212 of pattern handling unit 210 of receiving device 200 may measure changes to the capacitance of capacitor C and pattern handling unit 210 of receiving device 200 may receive first pattern 112.

Figure 3:
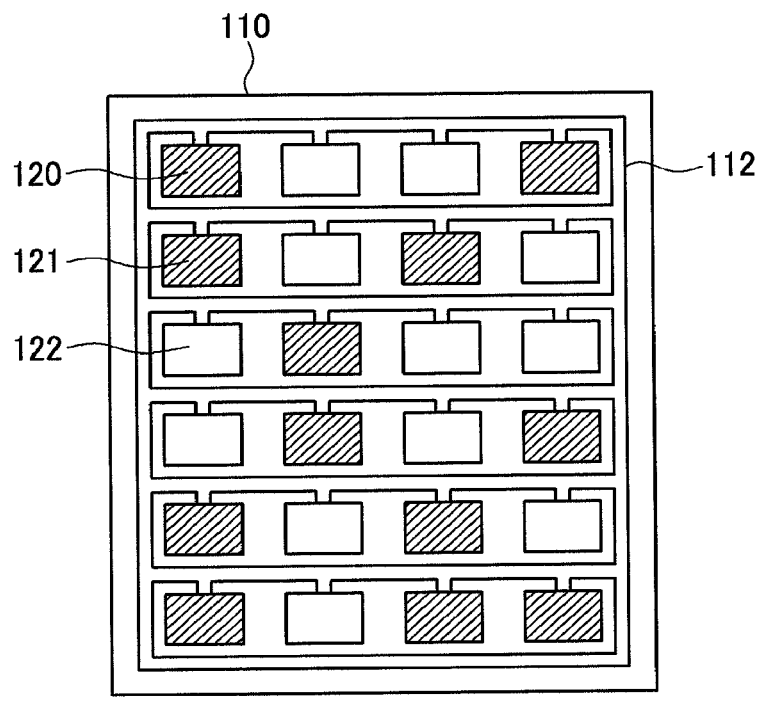
FIG. 3 schematically shows an illustrative example of a pattern handling unit of a transmitting device, arranged in accordance with at least some embodiments described herein.

FIG. 3 schematically shows an illustrative example of pattern handling unit 110 of transmitting device 100, arranged in accordance with at least some embodiments described herein. In some embodiments, as depicted in FIG. 3, pattern handling unit 110 may include multiple nodes 120. By way of example, but not as a limitation, each of nodes 120 may include a semi-conductor. In some embodiments, multiple nodes 120 may include at least one of a node that is set to have conductivity and a node that is set to have non-conductivity. For example, in FIG. 3, each of shaded nodes 121 is set to have conductivity and each of non-shaded nodes 122 is set to have non-conductivity. Pattern handling unit 110 may generate first pattern 112 by selectively changing conductivity of each of nodes 120.

When transmitting device 100, which includes the multiple nodes 120, is in contact with receiving device 200 or is adjacent to receiving device 200, first pattern 112 generated by the multiple nodes 120 may change capacitor C corresponding to capacitive sensor 212 of pattern handling unit 210 of receiving device 200 and then, pattern handling unit 210 of receiving device 200 may detect first pattern 112.

Figure 4A:
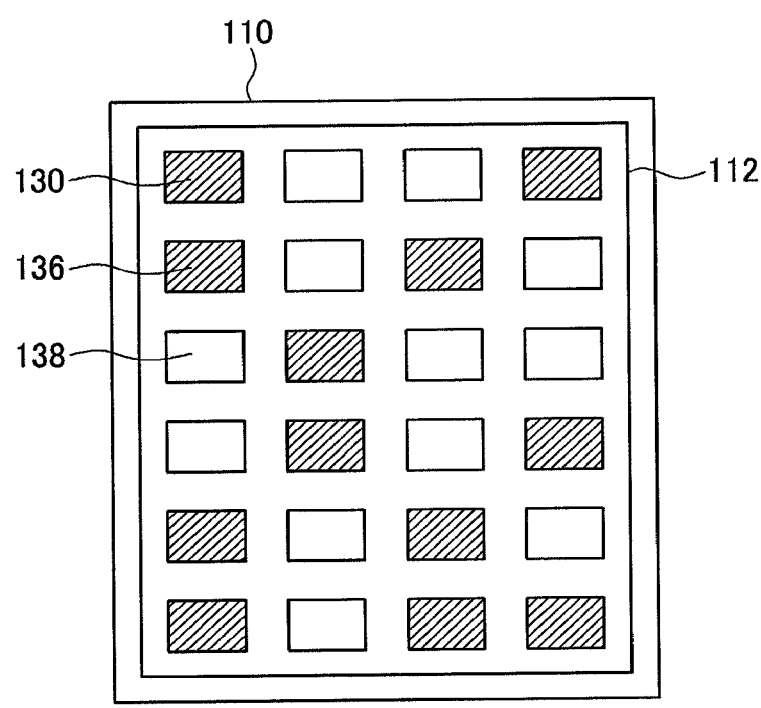
FIG. 4A schematically shows another illustrative example of a pattern handling unit of a transmitting device, arranged in accordance with at least some embodiments described herein.

FIG. 4A schematically shows another illustrative example of pattern handling unit 110 of transmitting device 100, arranged in accordance with at least some embodiments described herein. As depicted in FIG. 4A, pattern handling unit 110 may include multiple capacitive sensors 130.

Figure 4B:
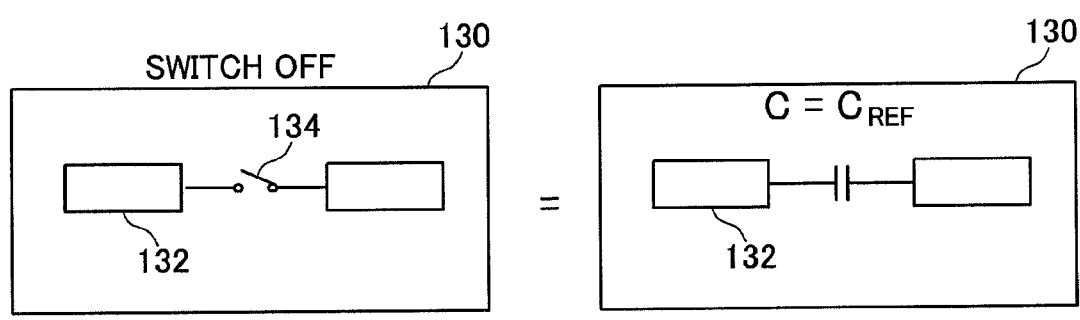
FIG. 4B schematically shows an illustrative example of a capacitive sensor which has two electrodes and a switch set to be off, arranged in accordance with at least some embodiments described herein.

FIG. 4B schematically shows an illustrative example of each of capacitive sensors 130 having two electrodes and a switch set to be off, arranged in accordance with at least some embodiments described herein.

Figure 4C:
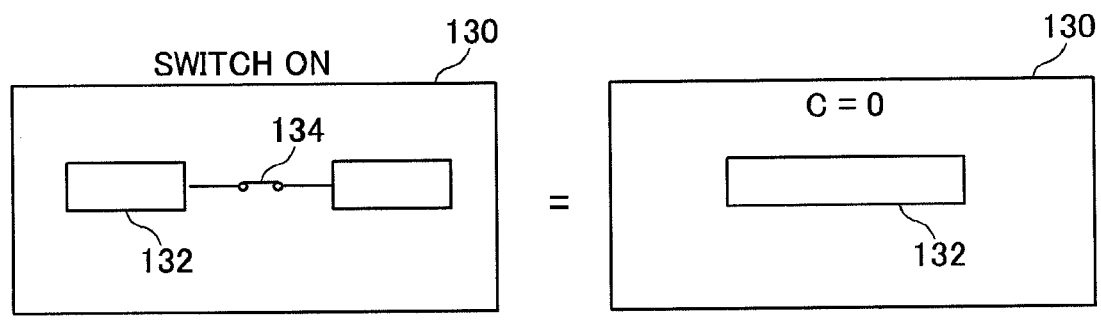
FIG. 4C schematically shows an illustrative example of a capacitive sensor which has two electrodes and a switch set to be on, arranged in accordance with at least some embodiments described herein.

FIG. 4C schematically shows an illustrative example of each of capacitive sensors 130 having two electrodes and a switch set to be on, arranged in accordance with at least some embodiments described herein. In some embodiments, each of capacitive sensors 130 may have two electrodes 132 and a switch 134 which is set to be on or off between two electrodes 132. In FIG. 4B, when switch 134 is set to be off between two electrodes 132, capacitor C between two electrodes 132 may have a certain capacitance value $C_{REF}$. In FIG. 4C, when switch 134 is set to be on between two electrodes 132, capacitance of capacitor C between two electrodes 132 may be equal to zero.

In some embodiments, multiple capacitive sensors 130 may include at least one of a capacitive sensor that has a switch set to be off between two electrodes and a capacitive sensor that has a switch set to be on between two electrodes. For example, but not as a limitation, in FIG. 4A, each of shaded capacitive sensors 136 may include switch 134 which is set to be off between two electrodes 132 (as depicted in FIG. 4B) and each of non-shaded capacitive sensors 138 may include switch 134 which is set to be on between two electrodes 132 (as depicted in FIG. 4C). Pattern handling unit 110 may generate first pattern 112 by changing capacitance of each of capacitive sensors 130 by selectively controlling each of switches 134 of capacitive sensors 130 to be set to be on or off between two electrodes 132.

When transmitting device 100, which includes the multiple capacitive sensors 130, is in contact with receiving device 200 or is adjacent to receiving device 200, first pattern 112 generated by the multiple capacitive sensors 130 may change capacitance of capacitor C corresponding to each of capacitive sensors 212 and then, pattern handling unit 210 of receiving device 200 may detect first pattern 112.

Figure 5A:
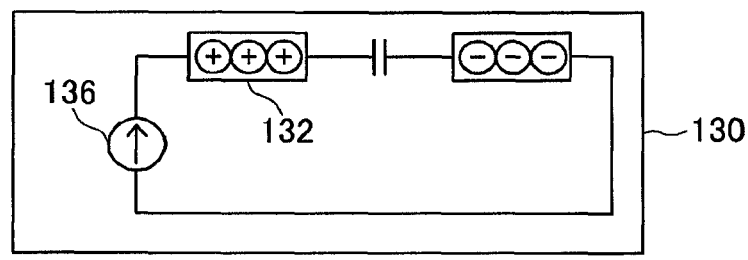
FIG. 5A schematically shows an illustrative example of a capacitive sensor which has a current source for applying positive current to two electrodes, arranged in accordance with at least some embodiments described herein.

FIG. 5A schematically shows an illustrative example of capacitive sensor 130 having a current source for applying positive current to two electrodes, arranged in accordance with at least some embodiments described herein. As depicted in FIG. 5A, capacitive sensor 130 may include two electrodes 132 and a current source 136 for applying current to two electrodes 132. When current source 136 applies positive current to two electrodes 132, one electrode of two electrodes 132 may accumulate positive electric charges and the other electrode of two electrodes 132 may accumulate negative electric charges.

Figure 5B:
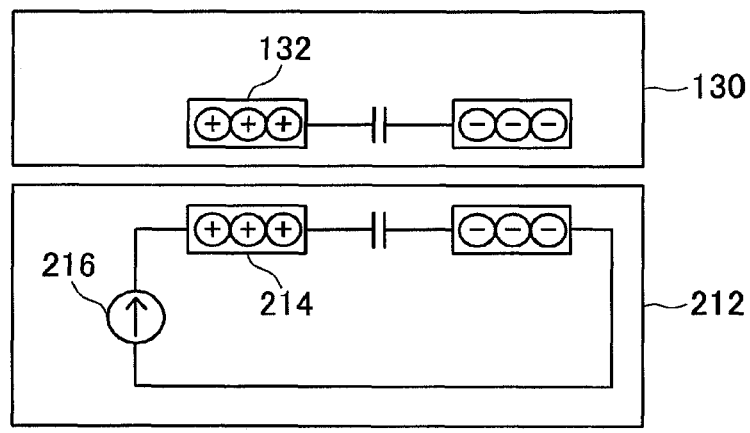
FIG. 5B schematically shows an illustrative example of an environment in which the capacitive sensor illustrated in FIG. 5A is in contact with or adjacent to a capacitive sensor of a receiving device, arranged in accordance with at least some embodiments described herein.

FIG. 5B schematically shows an illustrative example of an environment in which capacitive sensor 130 is in contact with or adjacent to capacitive sensor 212 of receiving device 200, arranged in accordance with at least some embodiments described herein. When capacitive sensor 130 is in contact with capacitive sensor 212 of receiving device 200 or is adjacent to capacitive sensor 212 of receiving device 200, a repulsive force may be generated between capacitive sensor 130 and capacitive sensor 212 and obstruct accumulation of electric charges in two electrodes 214 of capacitive sensor 212 of receiving device 200. Therefore, it may take relatively long time for a voltage between two electrodes 214 of capacitive sensor 212 of receiving device 200 to reach a threshold voltage.

Figure 5C:
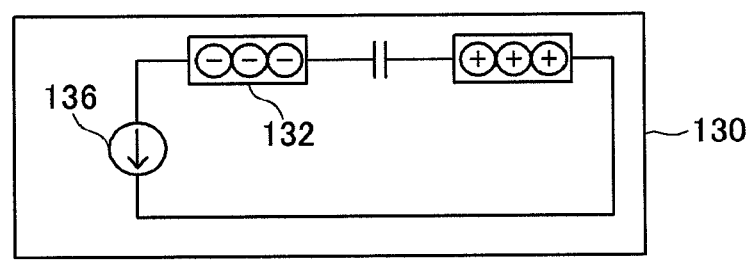
FIG. 5C schematically shows an illustrative example of a capacitive sensor which has a current source for applying negative current to two electrodes, arranged in accordance with at least some embodiments described herein.

FIG. 5C schematically shows an illustrative example of capacitive sensor 130 having a current source for applying negative current to two electrodes, arranged in accordance with at least some embodiments described herein. In some embodiments, capacitive sensor 130 may have two electrodes 132 and a current source 136 for applying current to two electrodes 132. When current source 136 applies negative current to two electrodes 132, one electrode of two electrodes 132 may accumulate negative electric charges and the other electrode of two electrodes 132 may accumulate positive electric charges.

Figure 5D:
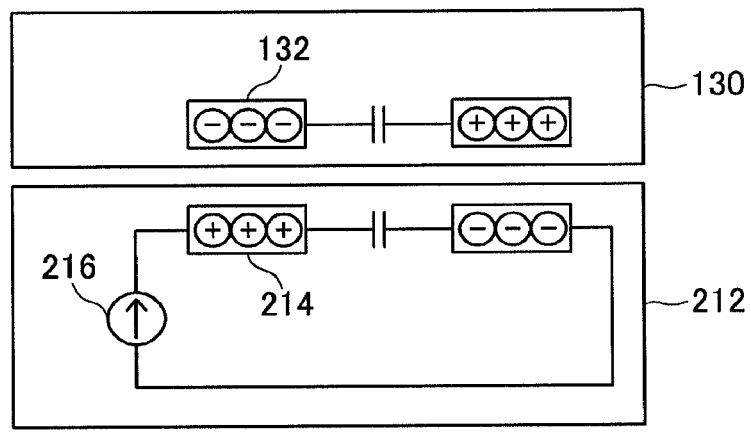
FIG. 5D schematically shows an illustrative example of an environment in which the capacitive sensor illustrated in FIG. 5C is in contact with or adjacent to a capacitive sensor of a receiving device, arranged in accordance with at least some embodiments described herein.

FIG. 5D schematically shows an illustrative example of an environment in which capacitive sensor 130 illustrated in FIG. 5C is in contact with or adjacent to capacitive sensor 212 of receiving device 200, arranged in accordance with at least some embodiments described herein. When capacitive sensor 130 is in contact with capacitive sensor 212 of receiving device 200 or is adjacent to capacitive sensor 212 of receiving device 200, an attractive force may be generated between capacitive sensor 130 and capacitive sensor 212 and help accumulation of electric charges in two electrodes 214 of capacitive sensor 212 of receiving device 200. Therefore, it may take relatively short time for a voltage between two electrodes 214 of capacitive sensor 212 of receiving device 200 to reach a threshold voltage.

In FIGS. 5A and 5C, capacitive sensor 130 is shown to include current source 136. However, alternatively, capacitive sensor 130 may include no current source. When capacitive sensor 130 does not include a current source and is in contact with capacitive sensor 212 of receiving device 200 or is adjacent to capacitive sensor 212 of receiving device 200, there is no force between capacitive sensor 130 of transmitting device 100 and capacitive sensor 212 of receiving device 200.

As described above, by changing the amount and/or the direction of the current applied to capacitive sensor 130 of pattern handling unit 110, transmitting device 100 may generate first pattern 112.

Figure 6A:
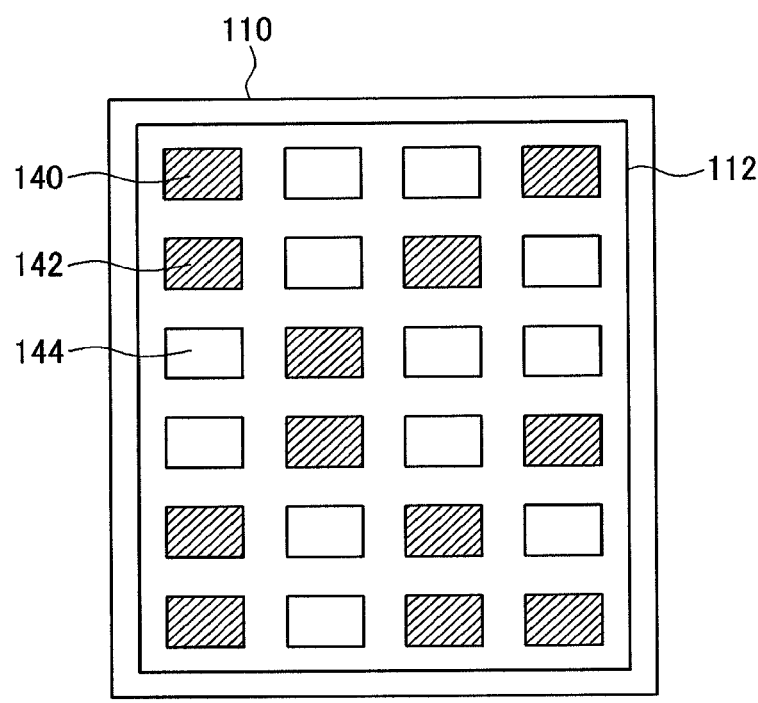
FIG. 6A schematically shows other illustrative example of a pattern handling unit of a transmitting device, arranged in accordance with at least some embodiments described herein.

FIG. 6A schematically shows other illustrative example of pattern handling unit 110 of transmitting device 100, arranged in accordance with at least some embodiments described herein. In some embodiments, as depicted in FIG. 6A, pattern handling unit 110 may include multiple nodes 140 which are capable of popping up from a screen of transmitting device 100. Each of multiple nodes 140 may include at least one of the multiple nodes 120 as illustrated in FIG. 3 and the multiple capacitive sensors 130 as illustrated in FIGS. 4A to 5D. For example, but not as a limitation, in FIG. 6A, each of shaded nodes 142 is a popped-up node, and each of non-shaded nodes 144 is a non-popped-up node.

Figure 6B:
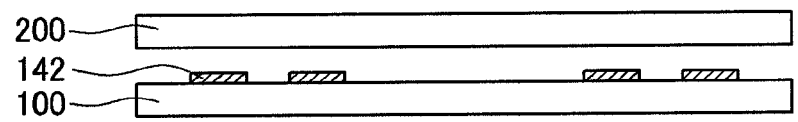
FIG. 6B schematically shows an example environment in which a transmitting device which has a multiple number of nodes which are capable of popping up is adjacent to a receiving device, arranged in accordance with at least some embodiments described herein.

FIG. 6B schematically shows an example environment in which transmitting device 100 having the multiple nodes 140 which are capable of popping up is adjacent to receiving device 200, arranged in accordance with at least some embodiments described herein. In FIG. 6B, a distance between popped-up node 142 and receiving device 200 is shorter than a distance between a non-popped-up node and receiving device 200. Accordingly, capacitance sensed by a capacitive sensor of receiving device 200 corresponding to the position of popped-up node 142 may be different from capacitance sensed by a capacitive sensor of receiving device 200 corresponding to a position of the non-popped-up node. In this way, pattern handling unit 110 of transmitting device 100 may generate first pattern 112 by selectively popping up each of a multiple number of nodes 140. Further, when transmitting device 100 is in actual contact with, or at least adjacent to, receiving device 200 the information associated with first pattern 112 is transmitted from transmitting device 100 to receiving device 200. In some embodiments, when a display or a screen of transmitting device 100 may actually be in contact with or adjacent to, within an acceptable or predetermined distance, that of receiving device 200, the information associated with first pattern 112 is transmitted from transmitting device 100 to receiving device 200.

In FIGS. 1 to 6B, although pattern handling unit 110 of transmitting device 100 is described to generate only first pattern 112, pattern handling unit 110 of transmitting device 100 may also generate a second pattern associated with second information to be transmitted to receiving device 200 after the lapse of a predetermined time from the generation of first pattern 112. Further, in FIGS. 1 to 6B, pattern handling unit 110 of transmitting device 100 generates first pattern 112, and pattern handling unit 210 of receiving device 200 receives first pattern 112. However, a part of pattern handling unit 110 of transmitting device 100 may generate one pattern associated with first information, while the rest part of pattern handling unit 110 of transmitting device 100 may generate other patterns associated with second information. The one pattern and the other pattern may be generated simultaneously or other pattern may be generated after a predetermined time from the generating of the one pattern. The number and the order of patterns generated by pattern handling unit 100 of transmitting device 100 may be modified in various ways.

FIG. 7 schematically shows another illustrative example of an environment in which transmitting device 100 is in contact with receiving device 200, arranged in accordance with at least some embodiments described herein. As depicted in FIG. 7, transmitting device 100 may include a pattern handling unit 150. In some embodiments, pattern handling unit 150 may generate a first pattern 160 associated with first information to be transmitted to receiving device 200 on a part of pattern handling unit 150. Pattern handling unit 150 may receive a second pattern 170 associated with second information to be transmitted from receiving device 200 and generated by receiving device 200 on a rest part of pattern handling unit 150.

As depicted in FIG. 7, receiving device 200 may include a pattern handling unit 220. In some embodiments, pattern handling unit 220 may receive first pattern 160 associated with the first information to be transmitted from transmitting device 100 on a part of pattern handling unit 220. Pattern handling unit 220 may generate second pattern 170 associated with the second information to be transmitted to transmitting device 100 on a rest part of pattern handling unit 220.

Pattern handling unit 150 may include at least one of the multiple nodes 120 as illustrated in FIG. 3, the multiple capacitive sensors 130 as illustrated in FIGS. 4A to 5D and the multiple nodes 140 that are capable of popping up as illustrated in FIGS. 6A to 6B, and the multiple capacitive sensors 212 as illustrated in FIGS. 2A to 2B. Pattern handling unit 220 may include at least one of the multiple nodes 120 as illustrated in FIG. 3, the multiple capacitive sensors 130 as illustrated in FIGS. 4A to 5D and the multiple nodes 140 that are capable of popping up as illustrated in FIGS. 6A to 6B, and the multiple capacitive sensors 212 as illustrated in FIGS. 2A to 2B.

In some embodiments, transmitting device 100 may generate first pattern 160 associated with first information to be transmitted to receiving device 200 and transmit first pattern 160 to receiving device 200 for a predetermined time period. Further, transmitting device 100 may receive second pattern 170 associated with second information to be transmitted from receiving device 200 and generated by receiving device 200 for another predetermined time period. Further, transmitting device 100 may also transmit first pattern 160 and receive second pattern 170 simultaneously.

In some embodiments, transmitting device 100 and receiving device 200 may be of different sizes. In some embodiments, transmitting device 100 may be a smart phone equipped with a touch screen, and receiving device 200 may be a tablet PC that is larger than the smart phone and has a touch screen. If transmitting device 100 comes into contact with or gets close to one region of receiving device 200, a first pattern associated with first information may be transmitted to receiving device 200. Further, when transmitting device 100 comes into contact with or gets close to another region of receiving device 200, a second pattern associated with second information may be transmitted to transmitting device 100 from receiving device 200. In some embodiments, transmitting device 100 may be a tablet PC having a touch screen, and receiving device 200 may be a smart phone that is smaller than the tablet PC and has a touch screen. If receiving device 200 comes into contact with or gets close to one region of transmitting device 100, a first pattern associated with first information may be transmitted to receiving device 200. Further, if receiving device 200 is in contact with or gets close to another region of transmitting device 100, a second pattern associated with second information may be transmitted to transmitting device 100 from receiving device 200.

Figure 8:
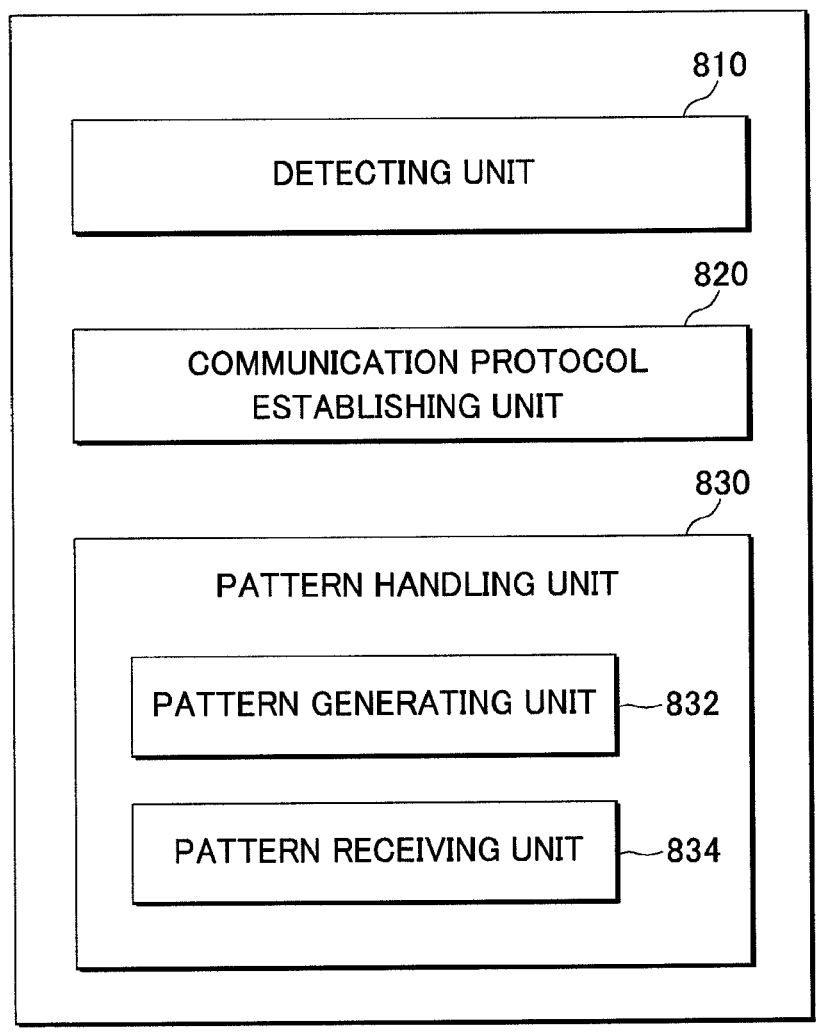
FIG. 8 shows a schematic block diagram illustrating an example architecture for a transmitting device, arranged in accordance with at least some embodiments described herein.

FIG. 8 shows a schematic block diagram illustrating an example architecture for transmitting device 100, arranged in accordance with at least some embodiments described herein. As depicted in FIG. 8, transmitting device 100 may include a detecting unit 810, a communication protocol establishing unit 820, and a pattern handling unit 830, which includes a pattern generating unit 832 and a pattern receiving unit 834. Although illustrated as discrete components, various components may be divided into additional components, combined into fewer components, or eliminated altogether while being contemplated within the scope of the disclosed subject matter.

Detecting unit 810 may detect a receiving device 200 communicating with transmitting device 100. By way of example, but not as a limitation, detecting unit 810 may detect receiving device 200 to which a first pattern associated with first information is transmitted or from which a second pattern associated with second information is transmitted to transmitting device 100.

Communication protocol establishing unit 820 may establish a communication protocol between transmitting device 100 and receiving device 200. By way of example, but not as a limitation, the communication protocol may include, but is not limited to, a text, a lookup table or a diagram defining association between a pattern and information. The communication protocol may further include a text, a lookup table or a diagram defining a predetermined time period for which transmitting device 100 transmits and receives the pattern. The communication protocol may further include a text, a lookup table or a diagram defining regions for performing transmission and reception of the pattern in transmitting device 100.

Pattern generating unit 832 of pattern handling unit 830 may generate the first pattern associated with the first information to be transmitted to receiving device 200 based at least in part on the communication protocol. Pattern generating unit 832 may include at least one of the multiple nodes 120 as illustrated in FIG. 3, the multiple capacitive sensors 130 as illustrated in FIGS. 4A to 5D, the multiple nodes 140 that are capable of popping up as illustrated in FIGS. 6A to 6B.

Pattern receiving unit 834 of pattern handling unit 830 may receive the second pattern associated with the second information to be transmitted from receiving device 200 and generated by receiving device 200. Pattern receiving unit 834 may include the multiple capacitive sensors 212 as illustrated in FIGS. 2A to 2B.

Figure 9:
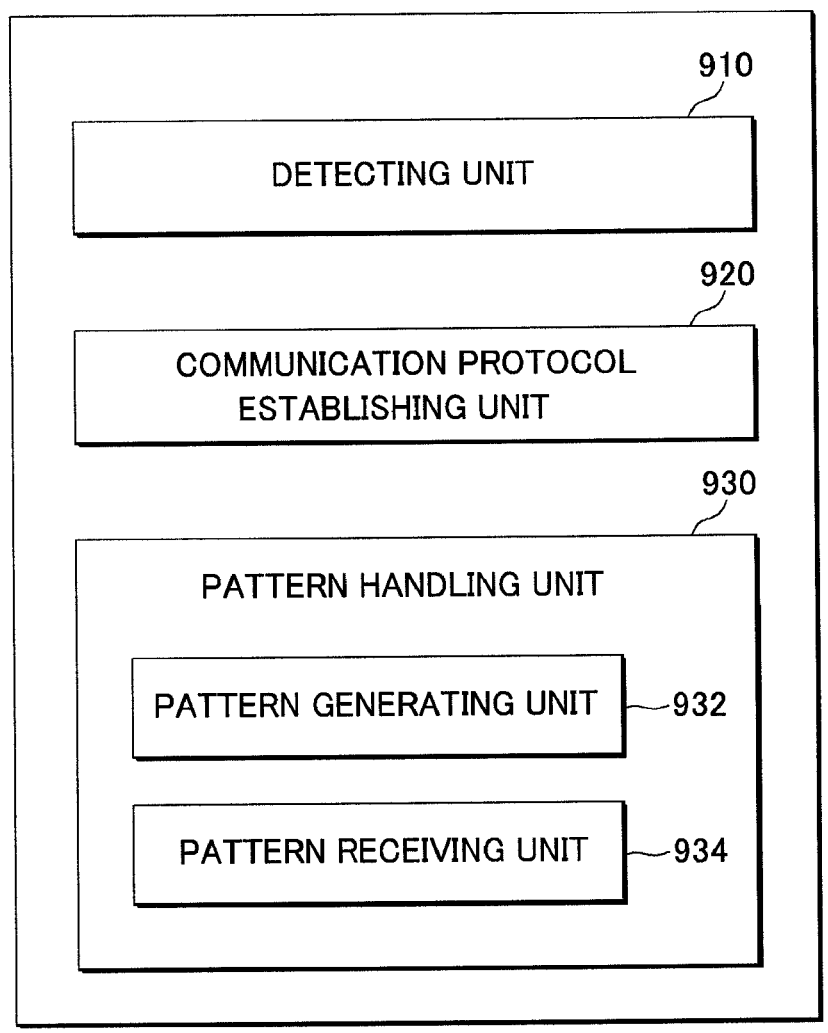
FIG. 9 shows a schematic block diagram illustrating an example architecture for a receiving device, arranged in accordance with at least some embodiments described herein.

FIG. 9 shows a schematic block diagram illustrating an example architecture for receiving device 200, arranged in accordance with at least some embodiments described herein. As depicted in FIG. 9, receiving device 200 may include a detecting unit 910, a communication protocol establishing unit 920, and a pattern handling unit 930, which includes a pattern generating unit 932 and a pattern receiving unit 934. Although illustrated as discrete components, various components may be divided into additional components, combined into fewer components, or eliminated altogether while being contemplated within the scope of the disclosed subject matter.

Detecting unit 910 may detect transmitting device 100 communicating with receiving device 200. By way of example, but not as a limitation, detecting unit 910 may detect transmitting device 100 from which a first pattern associated with first information is transmitted to receiving device 200 or to which a second pattern associated with second information is transmitted from receiving device 200.

Communication protocol establishing unit 920 may establish a communication protocol between transmitting device 100 and receiving device 200. By way of example, but not as a limitation, the communication protocol may include, but is not limited to, a text, a lookup table or a diagram defining association between a pattern and information. The communication protocol may further include a text, a lookup table or a diagram defining a predetermined time period for which receiving device 200 transmits and receives the pattern. The communication protocol may further include a text, a lookup table or a diagram defining regions for performing transmission and reception of the pattern in receiving device 200.

Pattern generating unit 932 of pattern handling unit 930 may generate the second pattern associated with the second information to be transmitted to transmitting device 100. Pattern generating unit 932 may include at least one of the multiple nodes 120 as illustrated in FIG. 3, the multiple capacitive sensors 130 as illustrated in FIGS. 4A to 5D, or the multiple nodes 140 that are capable of popping up as illustrated in FIGS. 6A to 6B.

Pattern receiving unit 934 of pattern handling unit 930 may receive the first pattern associated with the first information to be transmitted from transmitting device 100. Pattern receiving unit 934 may include the multiple capacitive sensors 212 as illustrated in FIGS. 2A to 2B.

Figure 10:
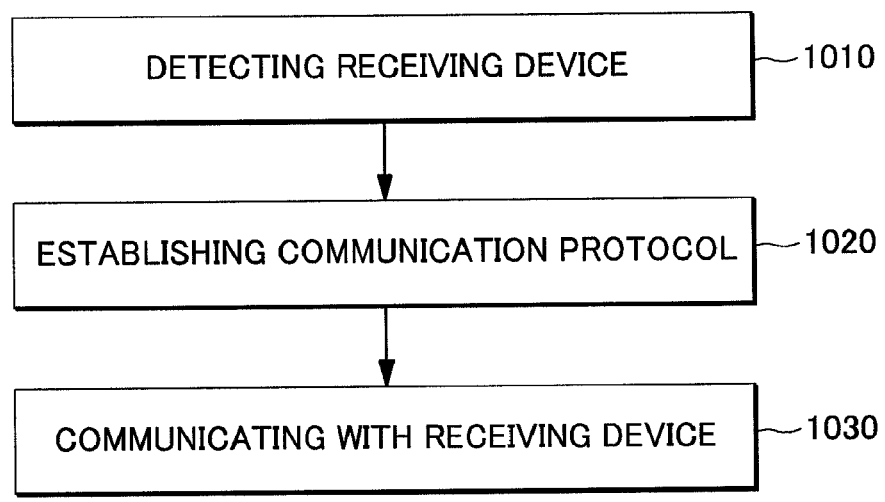
FIG. 10 shows an example flow diagram of a process of a transmitting device for communicating with a receiving device, arranged in accordance with at least some embodiments described herein.

FIG. 10 shows an example flow diagram of a process of a transmitting device for communicating with a receiving device, arranged in accordance with at least some embodiments described herein. The process in FIG. 10 may be implemented in or by transmitting device 100, which may include detecting unit 810, communication protocol establishing unit 820 and pattern handling unit 830 discussed above. An example process may include one or more operations, actions, or functions as illustrated by one or more blocks 1010, 1020 and/or 1030. Although illustrated as discrete blocks, various blocks may be divided into additional blocks, combined into fewer blocks, or eliminated, depending on the desired implementation. Processing may begin at block 1010.

At block 1010, transmitting device 100 may detect receiving device 200 which communicates with transmitting device 100. By way of example, but not as a limitation, transmitting device 100 may detect receiving device 200 to which a first pattern associated with first information is transmitted or from which a second pattern associated with second information is transmitted to transmitting device 100. Processing may continue from block 1010 to block 1020.

At block 1020, transmitting device 100 may establish a communication protocol between transmitting device 100 and receiving device 200. Processing may continue from block 1020 to block 1030.

At block 1030, transmitting device 100 may communicate with receiving device 200. By way of example, but not as a limitation, transmitting device 100 may generate the first pattern associated with the first information to be transmitted to receiving device 200 based at least in part on the communication protocol established at block 1020. When transmitting device 100 is in contact with or adjacent to receiving device 200, the first information associated with the first pattern may be transmitted to receiving device 200.

At block 1030, transmitting device 100 may receive the second pattern associated with the second information to be transmitted from receiving device 200 and generate by receiving device 200. Transmitting device 100 may decode the second pattern and acquire the second information based at least in part on the communication protocol established at block 1020.

Figure 11:
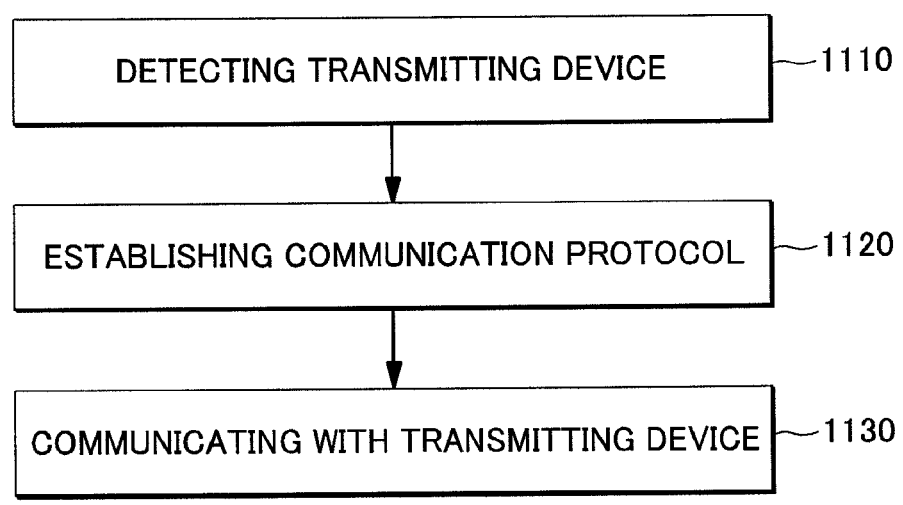
FIG. 11 shows an example flow diagram of a process of a receiving device for communicating with a transmitting device, arranged in accordance with at least some embodiments described herein.

FIG. 11 shows an example flow diagram of a process of a receiving device for communicating with a transmitting device, arranged in accordance with at least some embodiments described herein. The process in FIG. 11 may be implemented in or by receiving device 200, which may include detecting unit 910, communication protocol establishing unit 920 and pattern handling unit 930 discussed above. An example process may include one or more operations, actions, or functions as illustrated by one or more blocks 1110, 1120 and/or 1130. Although illustrated as discrete blocks, various blocks may be divided into additional blocks, combined into fewer blocks, or eliminated, depending on the desired implementation. Processing may begin at block 1110.

At block 1110, receiving device 200 may detect transmitting device 100, which communicates with receiving device 200. By way of example, but not as a limitation, receiving device 200 may detect transmitting device 100 from which a first pattern associated with first information is transmitted to receiving device 200 or to which a second pattern associated with second information is transmitted. Processing may continue from block 1010 to block 1020.

At block 1120, receiving device 200 may establish a communication protocol between transmitting device 100 and receiving device 200. Processing may continue from block 1120 to block 1130.

At block 1130, receiving device 200 may communicate with transmitting device 100. By way of example, but not as a limitation, when receiving device 200 is in contact with or adjacent to transmitting device 100, the first information associated with the first pattern may be transmitted to receiving device 200. Receiving device 200 may decode the first pattern and acquire the first information based at least in part on the communication protocol established at block 1120.

At block 1130, receiving device 200 may generate the second pattern associated with the second information to be transmitted to transmitting device 200 based at least in part on the communication protocol established at block 1120. When receiving device 200 is in contact with or adjacent to transmitting device 100, the second information associated with the second pattern may be transmitted to transmitting device 100.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 12:
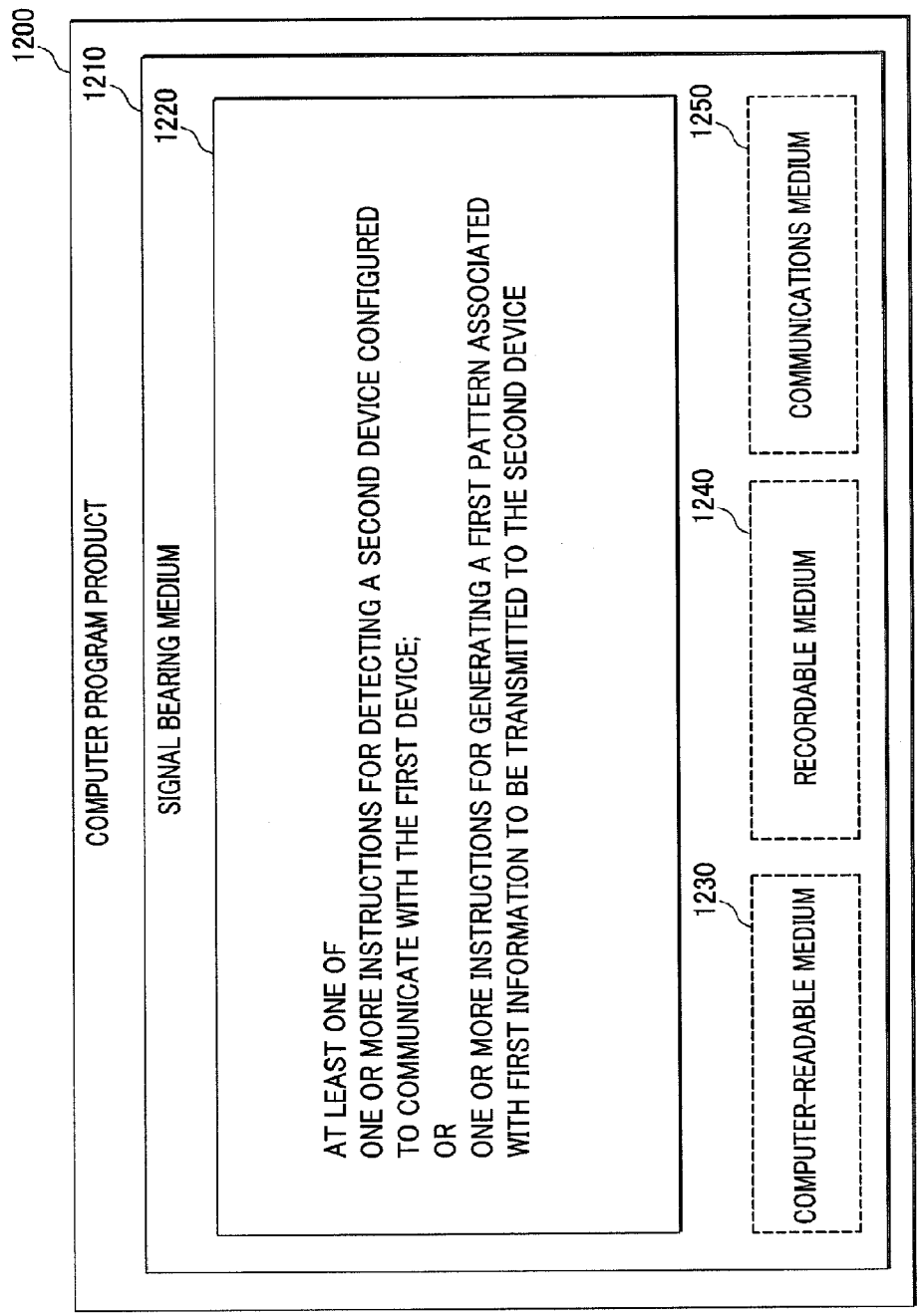
FIG. 12 illustrates computer program products that may be utilized to process data, arranged in accordance with at least some embodiments described herein.

FIG. 12 illustrates computer program products that may be utilized to process data, arranged in accordance with at least some embodiments described herein. Program product 1200 may include a signal bearing medium 1210. Signal bearing medium 1210 may include one or more instructions 1220 that, when executed by, for example, a processor, may provide the functionality described above with respect to FIGS. 1-11. By way of example, instructions 1220 may include: one or more instructions for detecting a second device configured to communicate with the first device; generating a first pattern associated with first information to be transmitted to the second device. Thus, for example, referring to FIG. 8, transmitting device 100 may undertake one or more of the blocks shown in FIG. 10 in response to instructions 1220. By way of example, instructions 1220 may include: one or more instructions for detecting a second device configured to communicate with the first device; one or more instructions for receiving a first pattern associated with first information and generated by the second device. Thus, for example, referring to FIG. 9, receiving device 200 may undertake one or more of the blocks shown in FIG. 11 in response to instructions 1220.

In some implementations, signal bearing medium 1210 may encompass a computer-readable medium 1230, including, but not limited to, a hard disk drive, a CD, a DVD, a digital tape, memory, etc. In some implementations, signal bearing medium 1210 may encompass a recordable medium 1240, including, but not limited to, memory, read/write (R/W) CDs, R/W DVDs, etc. In some implementations, signal bearing medium 1210 may encompass a communications medium 1250, including, but not limited to, a digital and/or an analog communication medium (e.g., a fiber optic cable, a waveguide, a wired communications link, a wireless communication link, etc.). Thus, for example, program product 1200 may be conveyed to one or more modules of transmitting device 100 and receiving device 200 by an RF signal bearing medium 1220, where the signal bearing medium 1220 is conveyed by a wireless communications medium 1250 (e.g., a wireless communications medium conforming with the IEEE 802.11 standard).

Figure 13:
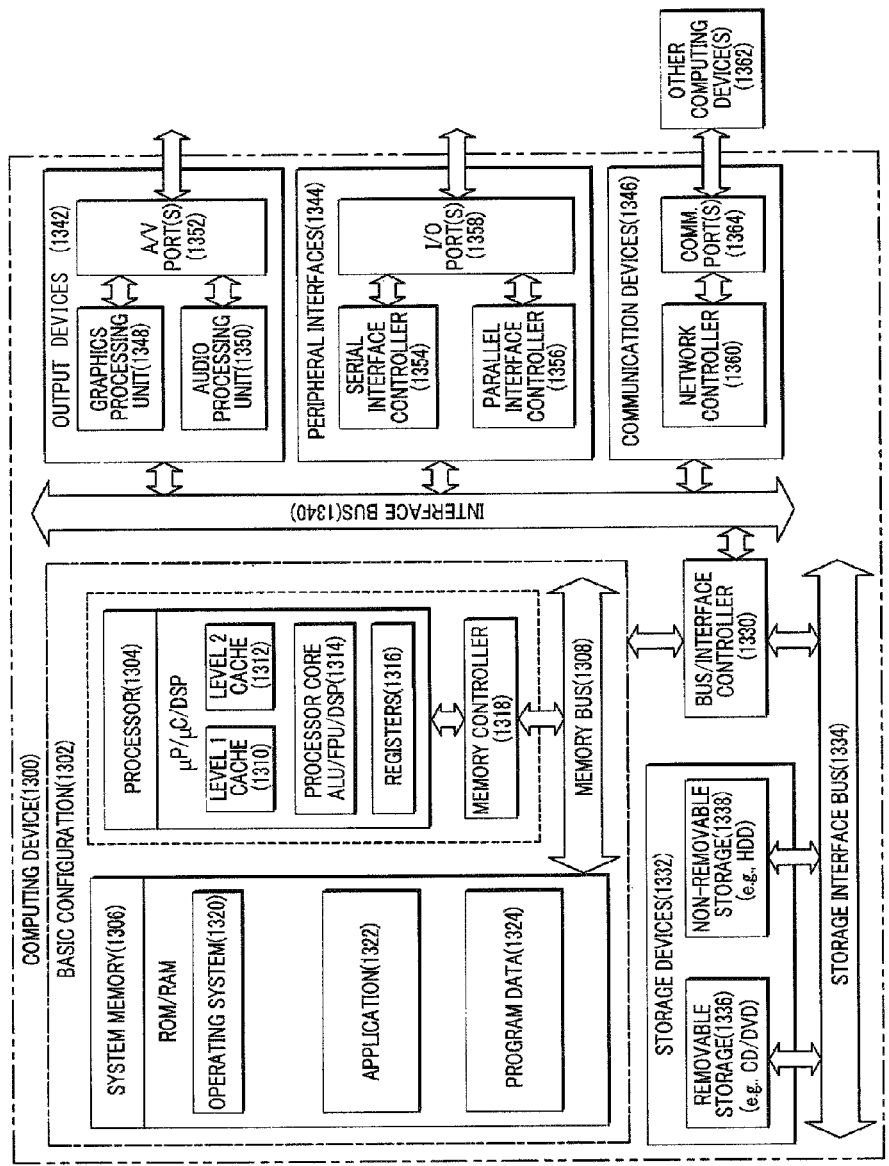
FIG. 13 is a block diagram illustrating an example computing device that may be utilized to process data, arranged in accordance with at least some embodiments described herein.

FIG. 13 is a block diagram illustrating an example computing device 1300 that may be utilized to process data, arranged in accordance with at least some embodiments described herein. In a very basic configuration 1302, computing device 1300 typically includes one or more processors 1304 and a system memory 1306. A memory bus 1308 may be used for communicating between processor 1304 and system memory 1306.

Depending on the desired configuration, processor 1304 may be of any type including but not limited to a microprocessor (µP), a microcontroller (µC), a digital signal processor (DSP), or any combination thereof. Processor 1304 may include one more levels of caching, such as a level one cache 1310 and a level two cache 1312, a processor core 1314, and registers 1316. An example processor core 1314 may include an arithmetic logic unit (ALU), a floating point unit (FPU), a digital signal processing core (DSP Core), or any combination thereof. An example memory controller 1318 may also be used with processor 1304, or in some implementations memory controller 1318 may be an internal part of processor 1304.

Depending on the desired configuration, system memory 1306 may be of any type including but not limited to volatile memory (such as RAM), non-volatile memory (such as ROM, flash memory, etc.) or any combination thereof. System memory 1306 may include an operating system 1320, one or more applications 1322, and program data 1324.

Computing device 1300 may have additional features or functionality, and additional interfaces to facilitate communications between basic configuration 1302 and any required devices and interfaces. For example, a bus/interface controller 1330 may be used to facilitate communications between basic configuration 1302 and one or more data storage devices 1332 via a storage interface bus 1334. Data storage devices 1332 may be removable storage devices 1336, non-removable storage devices 1338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1306, removable storage devices 1336 and non-removable storage devices 1338 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1300. Any such computer storage media may be part of computing device 1300.

Computing device 1300 may also include an interface bus 1340 for facilitating communication from various interface devices (e.g., output devices 1342, peripheral interfaces 1344, and communication devices 1346) to basic configuration 1302 via bus/interface controller 1330. Example output devices 1342 include a graphics processing unit 1348 and an audio processing unit 1350, which may be configured to communicate to various external devices such as a display or speakers via one or more A/V ports 1352. Example peripheral interfaces 1344 include a serial interface controller 1354 or a parallel interface controller 1356, which may be configured to communicate with external devices such as input devices (e.g., keyboard, mouse, pen, voice input device, touch input device, etc.) or other peripheral devices (e.g., printer, scanner, etc.) via one or more I/O ports 1358. An example communication device 1346 includes a network controller 1360, which may be arranged to facilitate communications with one or more other computing devices 1362 over a network communication link via one or more communication ports 1364.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1300 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1300 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a first device, comprising:
    detecting a second device configured to communicate with the first device;
    generating a first pattern associated with first information to be transmitted to the second device; and
    transmitting the first pattern associated with the first information to the second device when the first device is adjacent to the second device,
    wherein the first device is configured to have a first pattern handling unit on which the first pattern is generated, the first pattern handling unit being configured to have a plurality of first nodes,
    wherein the second device is configured to have a second pattern handling unit on which the first pattern is received, the second pattern handling unit being configured to have a plurality of second nodes, and
    wherein the first pattern includes a configuration of the plurality of first nodes, the configuration including at least one conductive node and at least one non-conductive node.

2. The method of claim 1, further comprising:
    establishing a communication protocol between the first device and the second device,
    wherein the first pattern is associated with the first information based at least in part on the communication protocol.

3. The method of claim 1, further comprising:
    transmitting the first information to the second device when the first device is in contact with the second device.

4. The method of claim 1, wherein the generating of the first pattern is performed by changing conductivity of each of the plurality of nodes.

5. The method of claim 1, wherein the first pattern handling unit is configured to have a plurality of capacitive sensors, and
    wherein the generating of the first pattern is performed by changing capacitance of each of the plurality of capacitive sensors.

6. The method of claim 1, further comprising:
    generating a second pattern associated with second information to be transmitted to the second device, and
    wherein the generating of the second pattern is performed after a predetermined time from the generating of the first pattern.

7. The method of claim 1, further comprising:
    receiving a third pattern associated with third information and generated by the second device.

8. The method of claim 7, wherein the first pattern is generated on a part of the first pattern handling unit and the third pattern is received on another part of the first pattern handling unit.

9. A method performed under control of a first device, comprising:
    detecting a second device configured to communicate with the first device; and
    receiving a first pattern associated with first information and generated by the second device when the first device is adjacent to the second device,
    wherein the first device is configured to have a first pattern handling unit having a plurality of first capacitive sensors on which the first pattern is received,
    wherein the receiving of the first pattern is performed by detecting capacitance of each of the plurality of first capacitive sensors of the first pattern handling unit,
    wherein the second device is configured to have a second pattern handling unit having a plurality of second capacitive sensors on which the first pattern is generated, and
    wherein the first pattern includes a configuration of the plurality of second capacitive sensors, the configuration including at least one conductive capacitive sensor and at least one non-conductive capacitive sensor.

10. The method of claim 9, further comprising:
    establishing a communication protocol between the first device and the second device,
    wherein the first pattern is associated with the first information based at least in part on the communication protocol.

11. The method of claim 9, wherein the receiving of the first pattern is performed when the first device is in contact with the second device.

12. The method of claim 9, further comprising:
    generating a second pattern associated with second information to be transmitted to the second device.

13. The method of claim 12, wherein the first pattern is received on a part of the first pattern handling unit and the second pattern is generated on another part of the first pattern handling unit.

14. A first device, comprising:
    a detecting unit configured to detect a second device, the second device communicating with the first device; and
    a first pattern handling unit configured to generate a first pattern associated with first information to be transmitted to the second device, and to transmit the first pattern to the second device, the first pattern handling unit being configured to have a plurality of first nodes,
    wherein the second device is configured to have a second pattern handling unit on which the first pattern is received, the second pattern handling unit being configured to have a plurality of second nodes, and
    wherein the first pattern includes a configuration of the plurality of first nodes, the configuration including at least one conductive node and at least one non-conductive node,
    wherein the first information is transmitted to the second device when the first device is adjacent to the second device.

15. The first device of claim 14, further comprising:
    a communication protocol establishing unit configured to establish a communication protocol between the first device and the second device,
    wherein the first pattern is associated with the first information based at least in part on the communication protocol.

16. The first device of claim 14, wherein the first pattern handling unit is further configured to generate the first pattern by changing conductivity of each of the plurality of nodes.

17. The first device of claim 14, wherein the first pattern handling unit is further configured to have a plurality of capacitive sensors, and
wherein the first pattern handling unit is further configured to generate the first pattern by changing capacitance of each of the plurality of capacitive sensors.

18. The first device of claim 14, wherein the first pattern handling unit is further configured to generate a second pattern associated with second information to be transmitted to the second device, and
wherein the first pattern handling unit is further configured to generate the second pattern after a predetermined time after generating of the first pattern.

19. The first device of claim 14, wherein the first pattern handling unit is further configured to receive a third pattern associated with third information and generated by the second device.

20. The first device of claim 19, wherein the first pattern is generated on a part of the first pattern handling unit and the third pattern is received on another part of the first pattern handling unit.

21. A first device, comprising:
a detecting unit configured to detect a second device, the second device communicating with the first device; and
a first pattern handling unit configured to receive a first pattern associated with first information and generated by the second device when the first device is adjacent to the second device,
wherein the first pattern handling unit is further configured to have a plurality of first capacitive sensors on which the first pattern is received,
wherein the first pattern handling unit is further configured to receive the first pattern by detecting capacitance of each of the plurality of first capacitive sensors,
wherein the second device is configured to have a second pattern handling unit having a plurality of second capacitive sensors on which the first pattern is generated, and
wherein the first pattern includes a configuration of the plurality of second capacitive sensors, the configuration including at least one conductive capacitive sensor and at least one non-conductive capacitive sensor.

22. The first device of claim 21, further comprising:
a communication protocol establishing unit configured to establish a communication protocol between the first device and the second device,
wherein the first pattern is associated with the first information based at least in part on the communication protocol.

23. The first device of claim 21, wherein the first information is transmitted to the first device when the first device is in contact with the second device.

24. The first device of claim 21, wherein the first pattern handling unit is further configured to generate a second pattern associated with second information to be transmitted to the second device.

25. The first device of claim 24, wherein the first pattern is received on a part of the first pattern handling unit and the second pattern is generated on another part of the first pattern handling unit.

26. A non-transitory computer-readable storage medium having stored thereon computer-executable instructions that, in response to execution, cause a first device to perform operations, comprising:
detecting a second device configured to communicate with the first device;
generating a pattern associated with information to be transmitted to the second device; and
transmitting the pattern associated with the information to the second device when the first device is adjacent to the second device,
wherein the first device is configured to have a first pattern handling unit on which the pattern is generated, the first pattern handling unit being configured to have a first plurality of nodes,
wherein the second device is configured to have a second pattern handling unit on which the pattern is received, the second pattern handling unit being configured to have a second plurality of nodes, and
wherein the pattern includes a configuration of the first plurality of nodes, the configuration including at least one conductive node and at least one non-conductive node.

27. A non-transitory computer-readable storage medium having stored thereon computer-executable instructions that, in response to execution, cause a first device to perform operations, comprising:
detecting a second device configured to communicate with the first device; and
receiving a pattern associated with information of the second device and generated by the second device when the first device is adjacent to the second device,
wherein the first device is configured to have a first pattern handling unit having a plurality of first capacitive sensors on which the first pattern is received,
wherein the receiving of the pattern is performed by detecting capacitance of each of the plurality of first capacitive sensors of the first pattern handling unit,
wherein the second device is configured to have a second pattern handling unit having a plurality of second capacitive sensors on which the first pattern is generated, and
wherein the first pattern includes a configuration of the plurality of second capacitive sensors, the configuration including at least one conductive capacitive sensor and at least one non-conductive capacitive sensor.

* * * * *